(12) United States Patent  (10) Patent No.: US 6,563,516 B1
Orlofsky  (45) Date of Patent: May 13, 2003

(54) REMOTE VIEWING OF RACK-MOUNTED PRINTED CIRCUIT CARDS

(75) Inventor: Paul Thomas Orlofsky, Lincroft, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 914 days.

(21) Appl. No.: 08/777,841

(22) Filed: Dec. 26, 1996

(51) Int. Cl.[7] ................................. G06F 3/00
(52) U.S. Cl. ...................... 345/735; 345/736; 345/705; 345/530
(58) Field of Search ................... 345/507, 329, 345/969, 1, 2, 156, 173, 330, 333, 334, 335, 735, 736, 705; 395/200.54; 340/635

(56) References Cited

U.S. PATENT DOCUMENTS

| 5,452,415 | A | * | 9/1995 | Hotka | ......................... 345/329 |
| 5,513,171 | A | * | 4/1996 | Ludwiczak et al. | ......... 370/254 |
| 5,798,738 | A | * | 8/1998 | Yamada | ......................... 345/2 |
| 5,815,080 | A | * | 9/1998 | Taguchi | ....................... 340/635 |

* cited by examiner

Primary Examiner—Richard Hjerpe
Assistant Examiner—Francis Nguyen
(74) Attorney, Agent, or Firm—Gregg Welte

(57) ABSTRACT

A system for providing information about the visual appearance of printed circuit cards in a card rack. A database is maintained at the site of the card rack, which contains data, such as a bit-map, indicating visual appearance of each card. When a remote party wishes to construct a computer display containing a view of a card, the party obtains the appropriate data from the database, and uses it to construct the image.

15 Claims, 9 Drawing Sheets

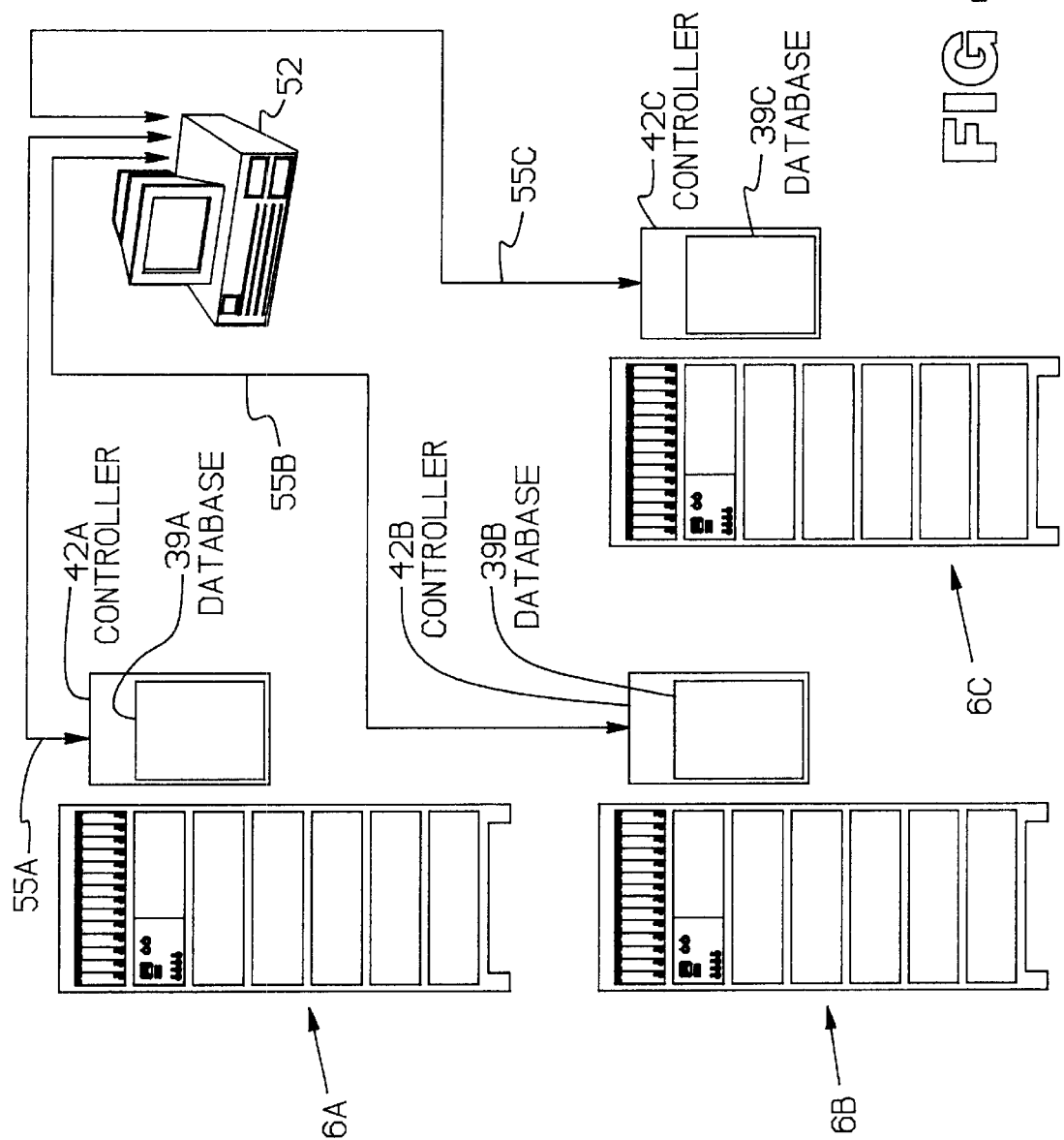

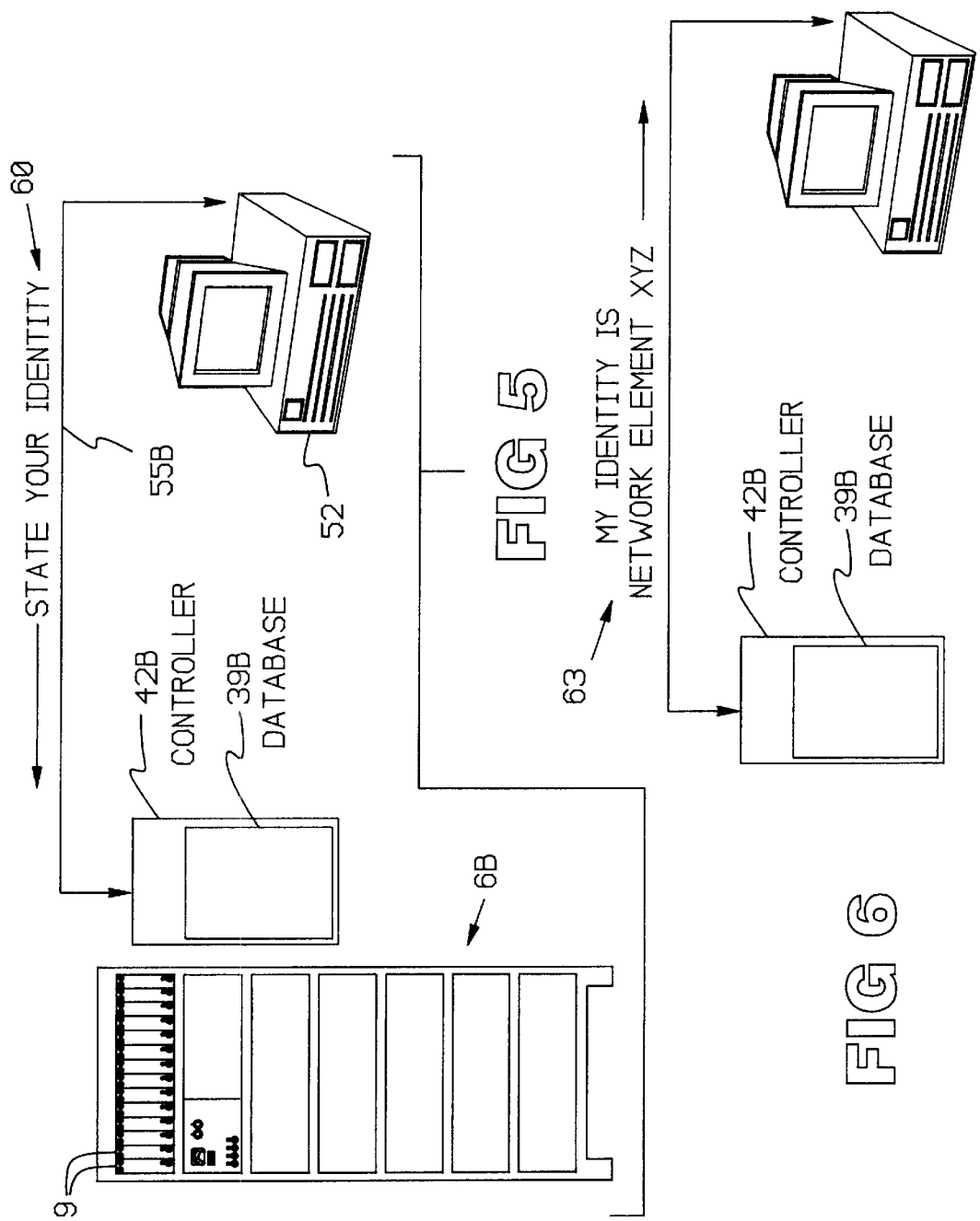

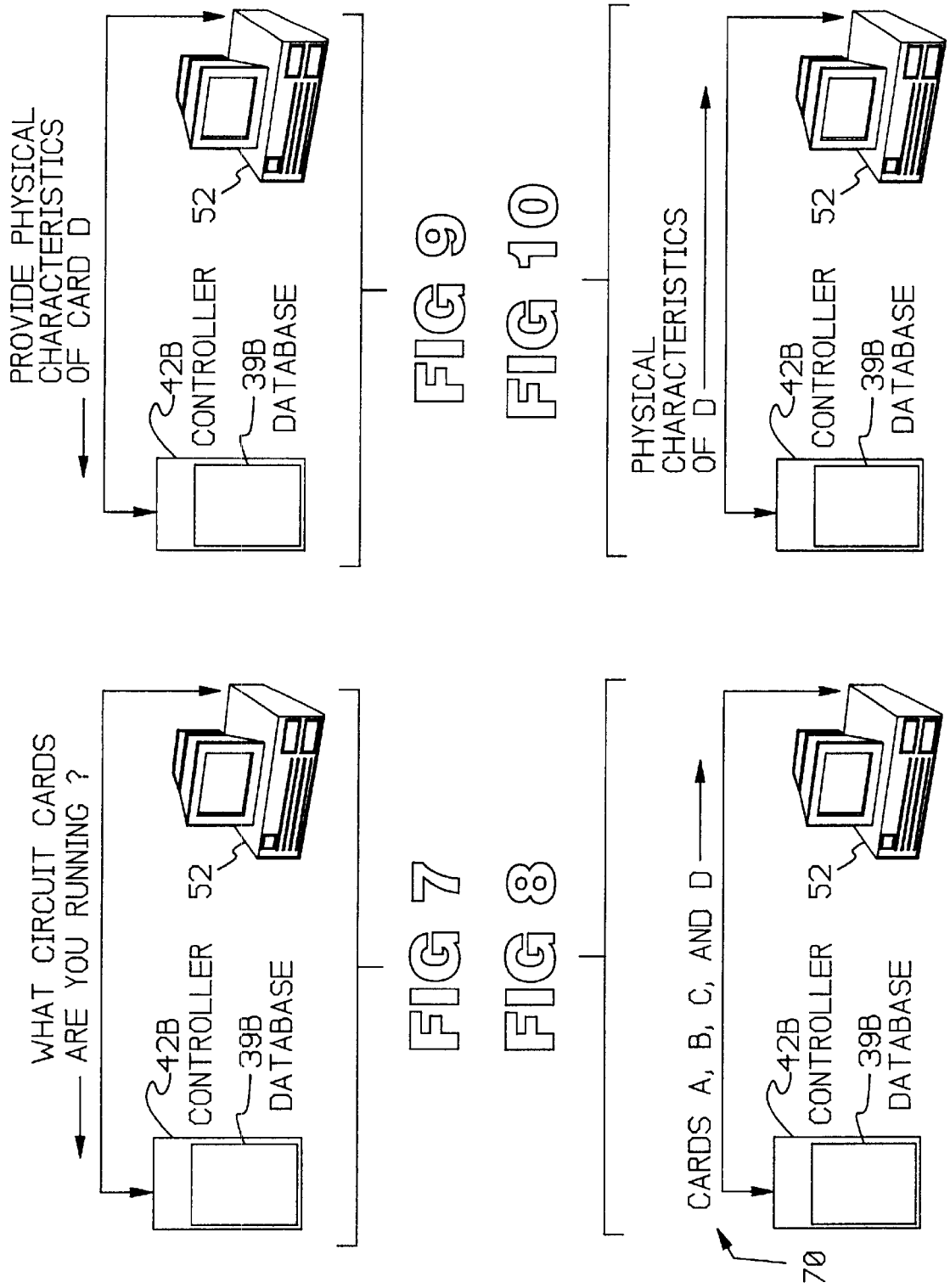

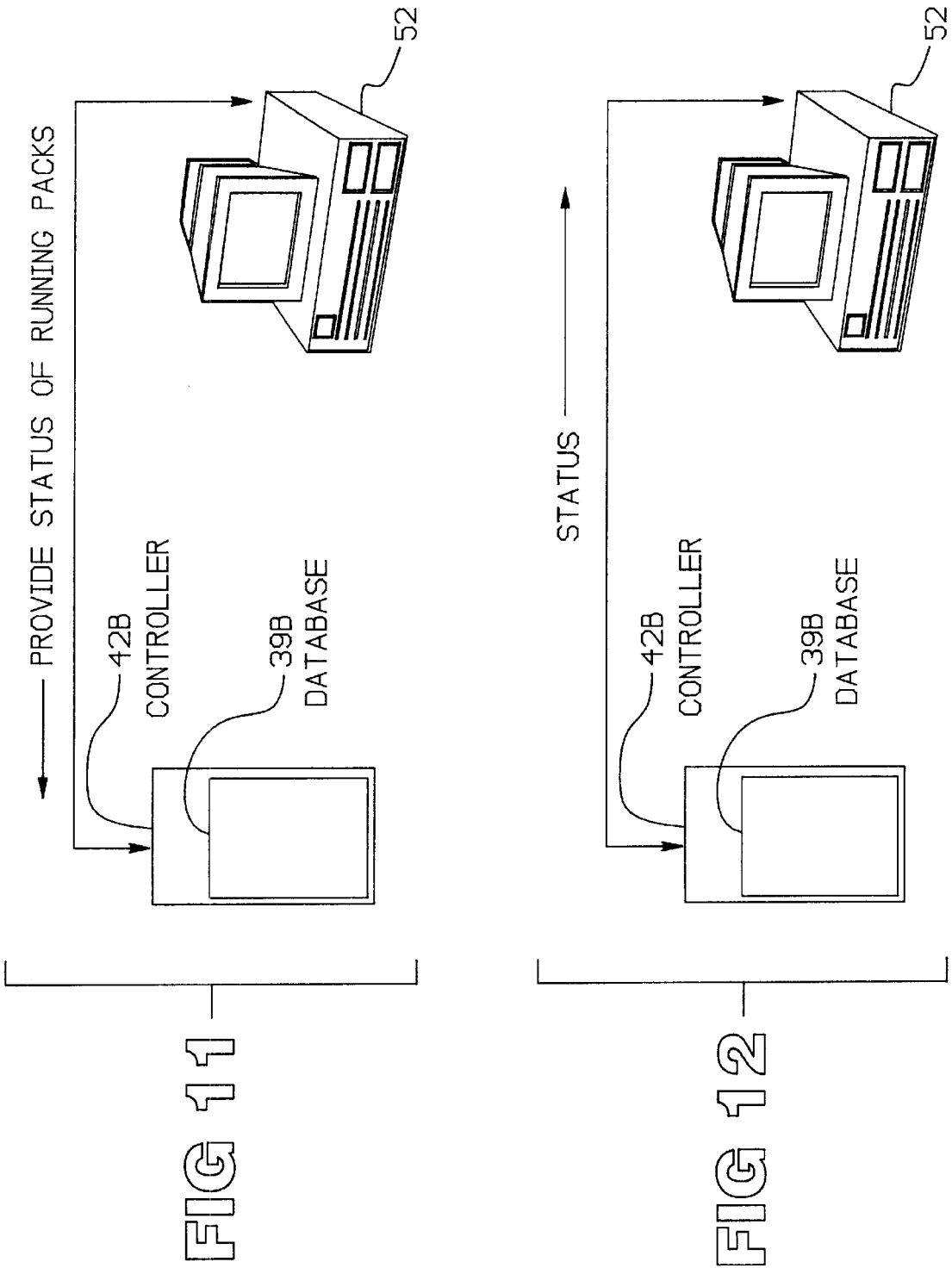

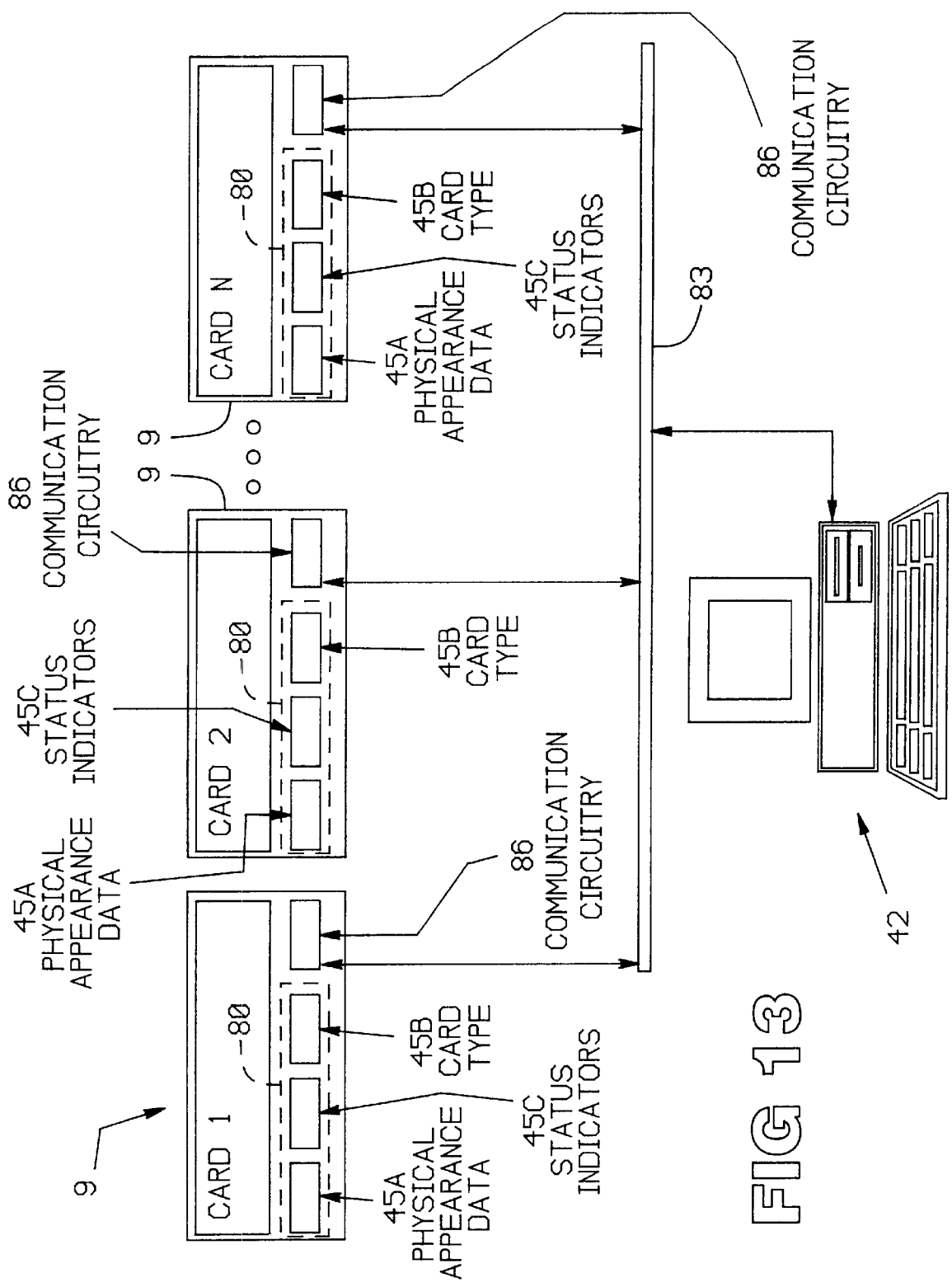

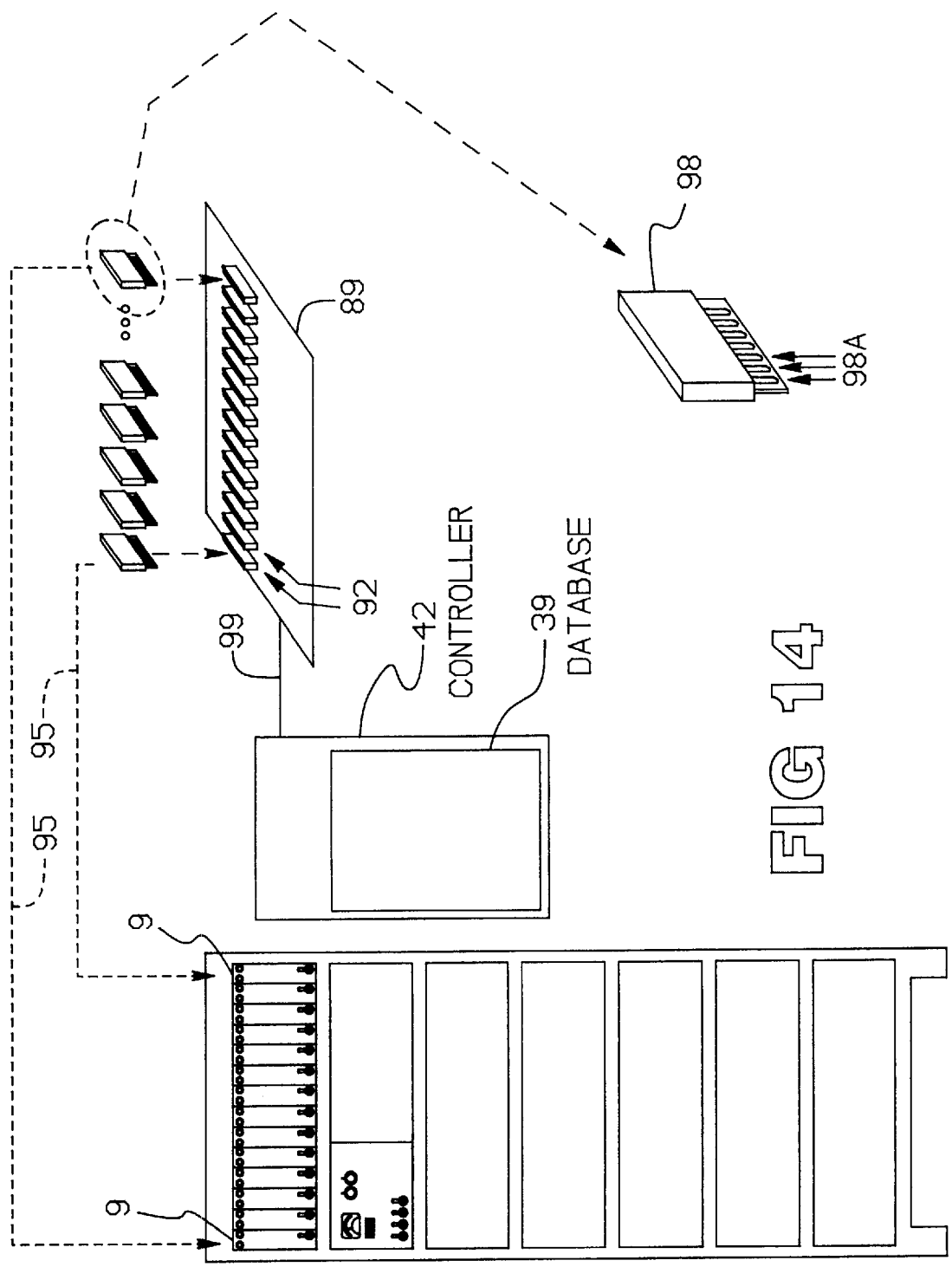

REMOTE VIEWING OF RACK-MOUNTED PRINTED CIRCUIT CARDS

BACKGROUND OF THE INVENTION

Rack-Mounted Printed Circuit Boards

Many electronic systems, such as telephone switching stations, or robotic manufacturing facilities, require extensive electronic circuitry for their operation. Frequently, the electronic circuitry is implemented in the form of numerous, interconnected, printed circuit boards. These printed circuit boards, commonly called "cards" or "packs," are often mounted in card cages, which are themselves supported by racks. FIG. 1 is a simplified example of a card cage 3, supported by a rack 6, and containing cards 9.

The individual cards often contain visual signal indicators, which provide information to technicians. For example, each card 9 of FIG. 1 may be equipped with an LED 12 which acts as a "pilot light," indicating whether the card is receiving electric power. Some cards 9 may be equipped with switches 13 which control power delivery to the card 9. As another example of an indicator, each card 9 may be equipped with a second LED 15, which indicates whether a certain type of fault has occurred in the card.

Regarding fault indication, some cards 9 include circuits in pairs, namely, a primary circuit and a back-up circuit (not shown). An LED indicator, such as indicator 15, provides three pieces of information about the pair, for example:

1. If neither circuit has experienced a fault, the LED indicator will display a green color.
2. If the primary circuit has experienced a fault, so that the back-up circuit has taken over operation, the LED indicator will display a yellow color.
3. If both the primary circuit and the back-up circuit have experienced faults, the LED indicator displays a red color.

In addition to cards 9, in the general case, the card cages 3 can include other equipment. Apparatus 18 illustrates a generic type of additional equipment. This apparatus 18 includes visual indicators, such as meter 21 and an LED bar graph 24. This apparatus 18 also includes dual-function controls, such as rotary dials 27 and switches 30. These latter components are termed dual-function, because they perform a control function, as by selecting a switch position in the case of rotary dials 27, and they also act as visual indicators, by visually indicating the position presently assumed by the switch. This apparatus can also include connectors 28 which connect with various components of the rack 6.

Two specific examples of such additional equipment 18 are (1) a power supply and (2) a testing-and-control center, which provides jacks and test ports which connect with all of the cards, to which test equipment can be connected.

Management Systems for Card Cages Shelf View

Management systems exist which allow a person, located remotely from the cards themselves, to view an image of the cards, including an image of the visual signal indicators. FIG. 2 is a representation of such an image, called a "shelf view," which is displayed on a computer monitor 36. Conceptually, the image resembles a television picture produced by a video camera which is focused on the cards 9 of FIG. 1.

However, the management systems, in general, do not actually use video cameras. Instead, they synthesize the image shown in FIG. 2, from two sources. One source is data which represents the basic visual appearance of the cards 9, but not of the indicators, such as LED 12. This data can take several forms.

One form is a bit-map, which can be derived from digitizing a photograph of the cards. Another form is a vector-map, which can be produced by a skilled artist who manually sketches the cards, as by using Computer Aided Drafting (CAD) software, or by tracing a photograph of the cards, using the same software. A significant feature of these forms of the image is that they are "static," since they do not change, as time progresses.

Superimposed over the static images is a "dynamic" image, which represents the current state of the signal indicators. In FIG. 2, for example, the image 15A may be displayed in the color red, thereby indicating the color shown by the actual LED 15 of FIG. 1. This color red can change with time, as the color of actual LED 15 in FIG. 1 changes.

In the more general case, as indicated in FIG. 2, additional visual indicators can be displayed, including switches 13 and 30, and the positions of rotary dials 27. In addition, if a particular card is absent, the slot previously occupied by the card is indicated by a greyed-out rectanngle 37.

Use of Shelf View

The management system is used to troubleshoot problems occurring in the cards 9. In a telephone switching station, thousands of cards may be contained in a single building, which is staffed by a single technician. Many such buildings are under control of a central office.

When a problem occurs in one of the buildings, an expert, located at the central office, and using the shelf view of FIG. 2, locates faulty cards, and guides the technician through the process of replacing the faulty cards.

However, the effectiveness of such management systems depends, in part, upon whether the display 36 in FIG. 2 accurately represents the visual appearance of the card cage of FIG. 1. For example, a technician may replace a card 9 with another card having a different appearance. For the display 36 of FIG. 2 to reflect this change, data indicative of the visual appearance of the new card must be supplied to the workstation. Otherwise, the shelf view of FIG. 2, seen by the expert located at the central office, will not correspond with the actual card cage seen by the technician, and confusion will result.

SUMMARY OF THE INVENTION

In one form of the invention, data indicative of the visual appearance of printed circuit cards, which are mounted in a rack, is stored at the site of the rack. Upon request, selected data is transmitted to a remote party.

BRIEF DESCRIPTION OF THE DRAWINGS

FIG. 4 illustrates communication links 55A–55C existing between a workstation 52 and racks 6A–6C.

FIGS. 5–12 illustrate a sequence of events undertaken in one form of the invention.

FIGS. 13 and 14 illustrate alternate embodiments of the invention.

DETAILED DESCRIPTION OF THE INVENTION

Figure 3:
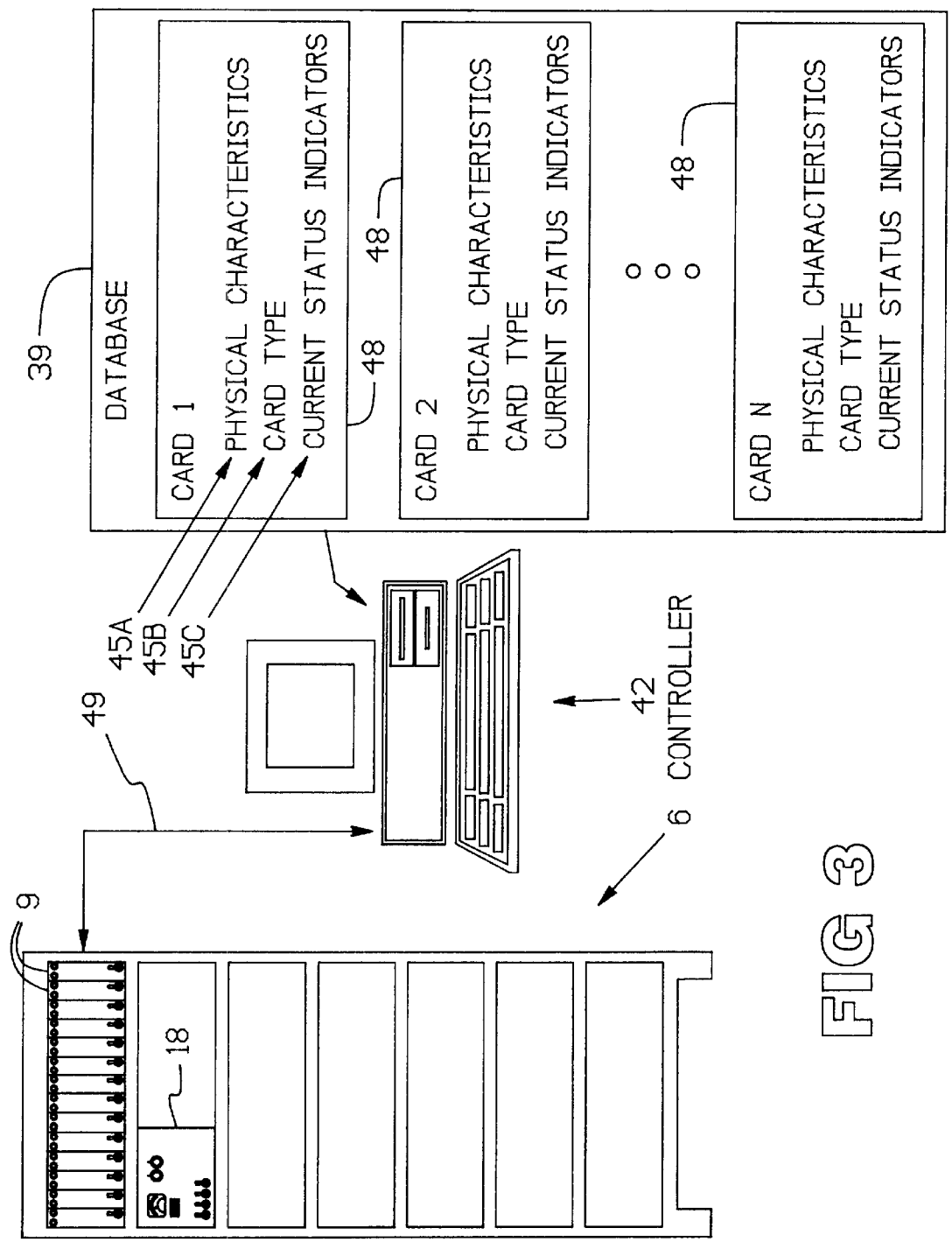
FIG. 3 illustrates one form of the invention.

FIG. 3 illustrates a simplified view of the invention. A database 39 is associated with the card rack 6. The database 39 can be stored in a control unit, which may take the form of a workstation 42, or a single-board controller (not shown) installed in a card 9. The database contains a record 48 for each card 9 and, within each record 48, three types of information, as indicated by the fields 45A, 45B, and 45C.

Field 45A contains the physical characteristics of the card 9. The physical characteristics allow computer-generation of the static image described above. The physical characteristics refer to the physical appearance of the card, and not to other physical features, such as physical operation of the electronic circuitry contained within the card.

From another point of view, a card 9 can be conceptualized as a 6-sided box. However, the physical appearance represents a view of the single, exposed, side (or face) shown in FIG. 1. That face includes the visual signal indicators 12 and 15.

When a card is mounted in the cage 3, the exposed face is the only side of the card visible to an observer standing before the rack 6. Thus, despite the fact that the card may have six sides, the exposed side is the only side of interest, and is taken to represent the physical appearance of the card. However, if more than one side of a card is of interest, then the static and dynamic images can be modified to include the additional sides.

The second field 45B indicates the card type. "Card type" refers to a description of the function which the card performs, and may take the form of a catalog part number of the card.

The third field 45C indicates the status of the visual indicators contained on the card. These indicators include, most commonly, the states of LEDs 12 and 15 in FIG. 1. But in the general case, the visual indicators include switch 13, meter 21, LED bar graph 24, and rotary switches 27 in FIG. 1, as well as all other visual indications which are relevant to an operator of the system.

It is not strictly necessary that the data of field 45C be stored within the database 39. One reason is that such storage is redundant, because field 45C reflects information already displayed by the indicators, such as LED 15 in FIG. 1. In a sense, the data is already stored at the indicators, and can be retrieved from them, when needed, as by using data link 49 in FIG. 3.

The invention utilizes the database 39 as follows. A large system contains multiple card racks, at different locations, indicated by the three racks 6A, 6B, and 6C in FIG. 4. A workstation 52 communicates with the controller 42 associated with each rack, as indicated by communication links 55. A user of the workstation 52 selects one of the racks, such as rack 6B indicated in FIG. 5, and sends message 60 to its controller 42B, requesting that the controller 42B identify itself. As FIG. 6 indicates, the controller 42B identifies itself by transmitting message 63.

Next, as in FIG. 7, the workstation 42 asks controller 42B to identify either (a) the cards 9 contained in its rack 6B (shown in FIG. 5), or (b) the cards 9 which are actually operational, as appropriate. In FIG. 8, the controller 42B identifies these cards. (Four cards, namely A, B, C, and D are indicated, for simplicity, rather than the fourteen cards shown in rack 6B of FIG. 5.) The cards are identified by their "card type," taken from fields 45B in FIG. 3.

The workstation 52 in FIG. 8 then ascertains whether it is in possession of the physical characteristics of all the cards identified by message 70. Assume that the workstation 52 knows the physical characteristics of all of the cards identified, except card D. When the workstation 52 detects the absence of the physical characteristics of card D, the workstation 52 requests the physical characteristics of card D, as indicated in FIG. 9. That is, the workstation 52 requests a bit-map, or vector map, as appropriate, which indicates the static appearance of card D. The controller 42B supplies the physical characteristics, as indicated in FIG. 10.

Figure 1:
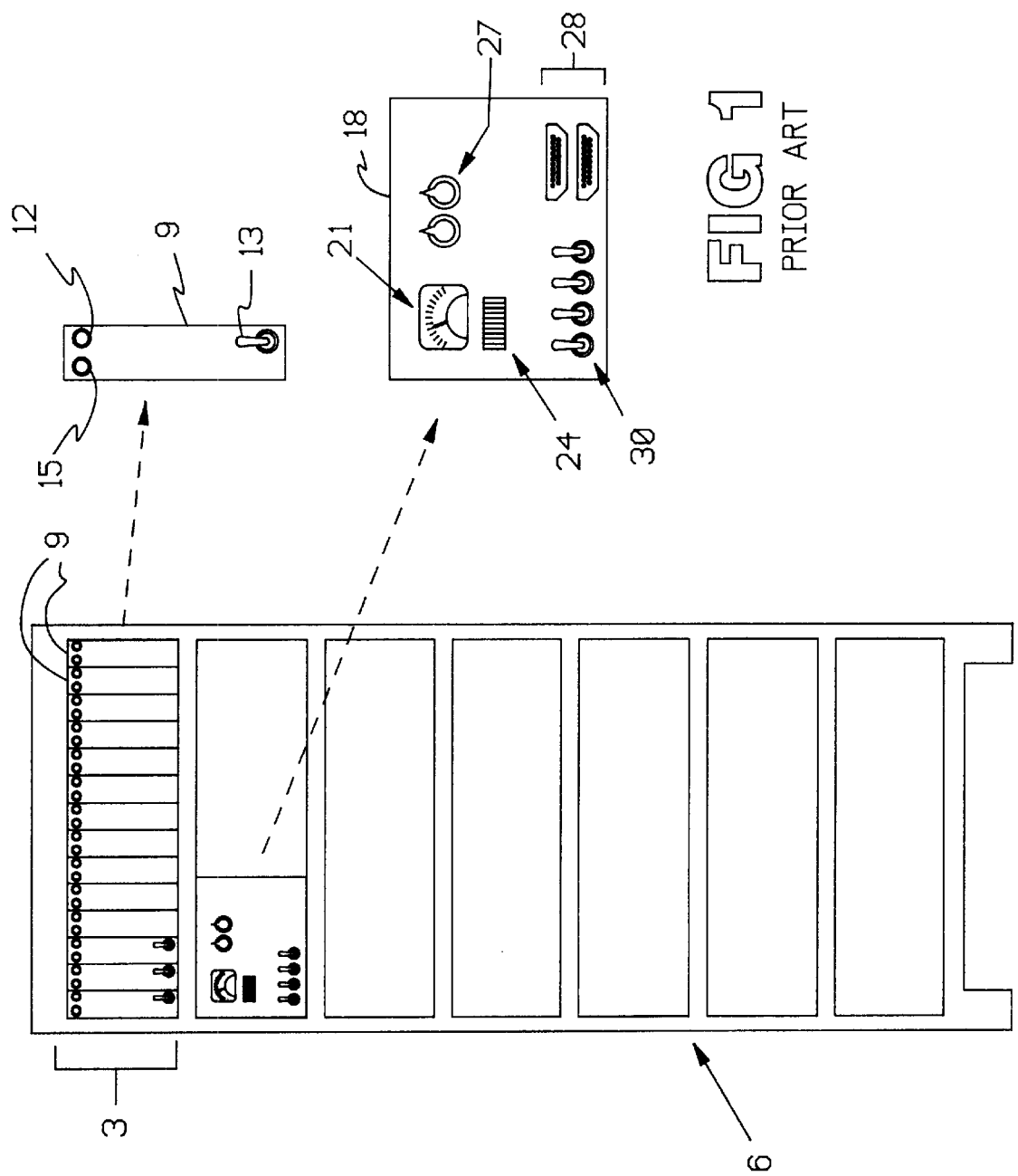
FIG. 1 illustrates rack-mounted printed circuit cards 9.

Next, the workstation 52 requests the current status of the visual indicators of the cards, such as LEDs 12 and 15 in FIG. 1, as indicated in FIG. 11. The controller 42B transmits the status data, as indicated in FIG. 12. This status data is taken from fields 45C in FIG. 3, and allows the current state of the visual indicators to be replicated.

The transmission of FIG. 12 is repeated either (1) periodically by the controller 42B, (2) in response to periodic requests made by the workstation 52, as in FIG. 11, (3) whenever a status indicator changes, or (4) in some other way to assure that the workstation 52 is always in possession of the current states of the status indicators.

Figure 2:
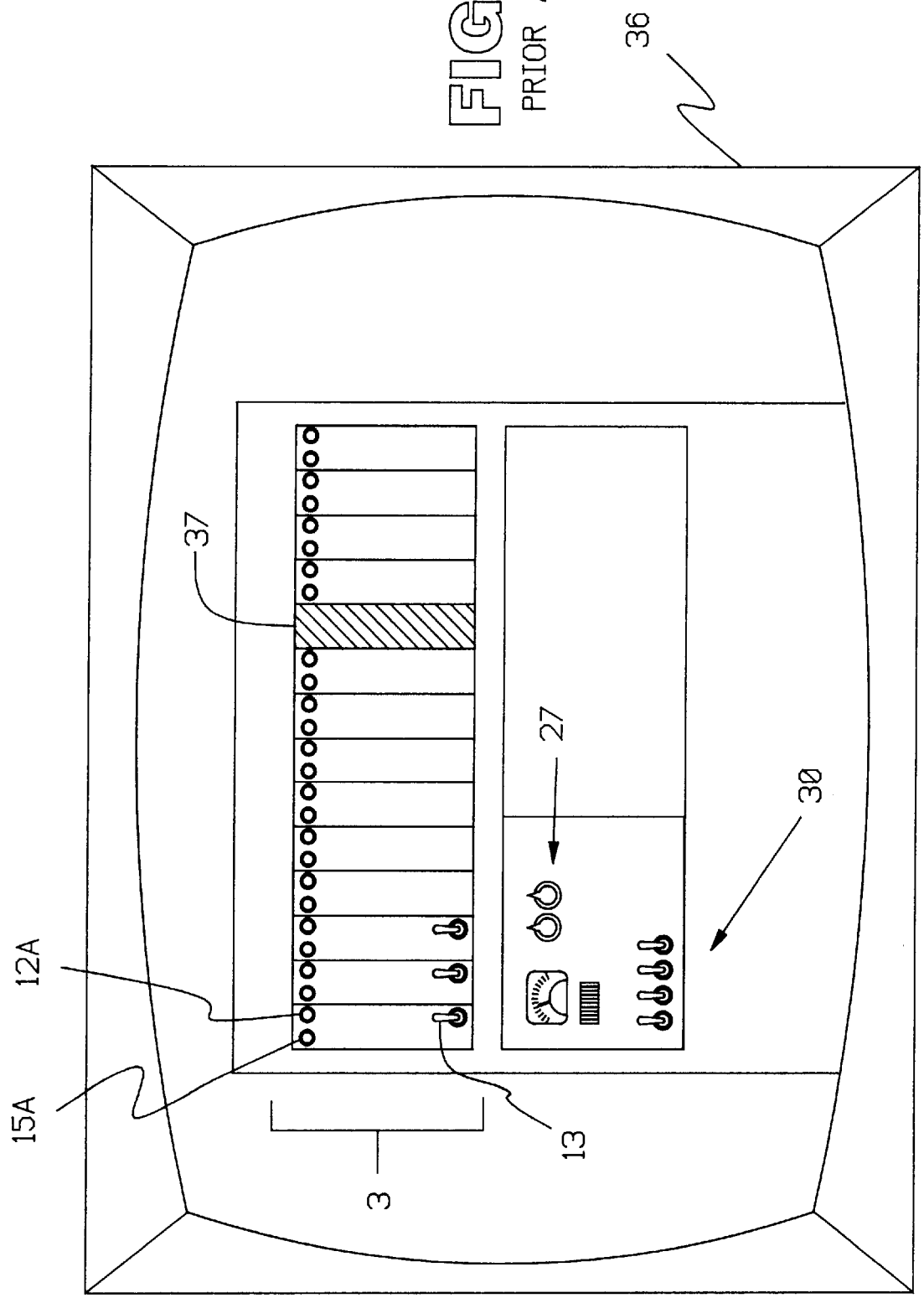
FIG. 2 illustrates an image of the equipment of FIG. 1, generated by a workstation (not shown).

Using the data received through the transmissions just described, the workstation 52 generates an image resembling that of FIG. 2, indicating a view of the cards 9, and other equipment 18, if present, together with their status indicators.

Significantly, the database 39 in FIG. 3 is located at the site of the rack 6. Whenever a card 9 is replaced in FIG. 3, the database 39 is updated by a technician, so that the record 48 of that card will thereafter contain accurate data, particularly concerning the physical characteristics of the card. That is, if a new card 9, having a new appearance, replaces an old card of different appearance, the card's record in the database 39 is changed accordingly.

With this updating of the database 39, whenever the workstation 52 of FIG. 9 requests the physical characteristics of the cards 9, up-to-date physical characteristics are supplied, so that the workstation 52 can generate an accurate image, of the type shown in FIG. 2.

Alternate Embodiments

FIG. 3 indicates that the database 39 is stored within controller 42. However, other storage approaches can be undertaken, such as that shown in FIG. 13.

Each card 9 contains memory, indicated by dashed box 80. The memory 80 contains data corresponding to fields 45A, 45B, and 45C, of FIG. 3, as indicated in FIG. 13. This memory 80 is made available to controller 42, also shown in FIG. 3, through bus 83 in FIG. 13.

Each card is equipped with communication circuitry 86, which can take the form of a standard memory controller. The controller 42 knows the memory addresses, within memory 80, occupied by each of fields 45A, 45B, and 45C. The controller 42, when requested, reads the appropriate addresses, by issuing the proper "read" signals to the communication circuitry 86.

In the embodiment of FIG. 13, each card 9 contains its own record within memory 80, analogous to record 48 in FIG. 3. When a card is removed, and replaced, the physical characteristics of the replacement card are automatically supplied to the system, by virtue of being present in the replacement card itself.

FIG. 14 illustrates another approach to storing the database 39 of FIG. 3. Controller 42 is given access to a card 89, which contains connectors 92. Each connector 92 corresponds, by position, to a respective card 9, as indicated by dashed arrows 95.

Each connector 92 receives a plug-in memory module 98 which bears card-edge connector fingers 98A, which mate with the connector 92. The memory module 98 stores the data of fields 45A and 45B in FIG. 13, namely, "physical characteristics" and "card type." The other type of data, namely, that of field 45C, indicating the current status of the visual indicators, is read in the usual manner, as from the cards 9 themselves. A technician (not shown) assures that the memory modules 98 are plugged into the proper connectors 92.

In operation, the controller 42 in FIG. 4, when requested by controller 52, reads the appropriate memory modules 98 in FIG. 14, and delivers the information obtained, in the manner described in connection with FIGS. 5–12.

A significant feature of FIGS. 13 and 14 is that the database 39 of FIG. 3 does not require re-programming when a card 9 is changed. Restated, the technician responsible for changing a card 9 is not required to deal with any software involved with the database 39.

FIG. 14 has an advantage over FIG. 13, in the respect that the architecture of the cards 9 need not be changed, in order to implement the approach of FIG. 14. The controller 42 is only required to be given access to bus 99, and to be re-programmed appropriately, to read the memory within printed circuits 98.

Additional Embodiment

FIG. 10 indicates that the workstation 52 obtains the physical-characteristics-data from controller 42B. An alternate approach is to provide the workstation 52 with an address where the physical characteristics are located, rather than the physical characteristics themselves.

For example, it may be expected that the manufacturers of the cards 9 are the best sources of the physical characteristics. By pre-arrangement, manufacturers may, individually or collectively, maintain an on-line database which contains the physical characteristics of their cards. Such a database would be somewhat analogous to the databooks which manufacturers of integrated circuits (ICs) presently provide for their ICs, which contain engineering drawings showing the physical characteristics of the ICs.

The controller 42B in FIG. 10 may, when requested as in FIG. 9, refer the workstation 52 to this database, or the workstation 52 may be programmed to consult this database directly. In either case, the workstation 52 contacts the database, as by using an INTERNET address, and locates the physical characteristics desired, based on the card type, obtained from workstation 42B.

One advantage of this approach is that the database is maintained by the parties having the best knowledge of the physical characteristics of the cards 9, namely, the manufacturers.

RELATED PATENT

U.S. Pat. No. 5,513,171, Ser. No. 280,421, issued Apr. 30, 1996, to Ludwiczak, et al., discusses a network management facility, and is hereby incorporated by reference.

Numerous substitutions and modifications can be undertaken without departing from the true spirit and scope of the invention. What is desired to be secured by Letters Patent is the invention as defined in the following claims.

I claim:

1. For a collection of electronic circuits located at a site, at least some of which bear visual signal indicators, the improvement comprising:
   a) a data storage facility, located at the site, which stores image-data indicative of a view of each individual electronic circuit;
   b) controller means for
      i) examining a group of the electronic circuits and identifying the type of each electronic circuit within the group;
      ii) transmitting data indicating the types within the group to a remote location; and
      iii) if a system at the remote location requests image-data corresponding to specific types, transmitting said image-data to the remote location.

2. System according to claim 1, and further comprising:
   c) a data link by which the controller means can obtain, from the electronic circuits, data indicative of present state of status indicators.

3. System according to claim 1, wherein the visual indicators comprise light sources, mechanical toggle switches, and mechanical rotary switches.

4. System according to claim 1, wherein the electronic circuits take the form of cards, and the group comprises cards within a rack.

5. System according to claim 4, wherein the controller means enables display apparatus at the remote location to accurately display views of all cards within the group both
   i) before replacement of a card within the rack by a card of a different type, and
   ii) after the replacement.

6. System according to claim 1, wherein each electronic circuit contains the image-data indicating its appearance.

7. A method of operating a group of electronic circuits, located at a site, which display one or more visual indicators, comprising the following steps:
   a) storing image-data at the site which indicates visual appearance of the electronic circuits;
   b) examining a selected group of electronic circuits and identifying their individual types;
   c) transmitting, to a remote location, data indicative of the types identified; and
   d) if image data is not located at the remote location for some types identified, requesting that image data be sent for those types.

8. Method according to claim 7, and further comprising the step of:
   c) transmitting data indicative of present status of a visual indicator to the remote location.

9. Method according to claim 7, wherein the visual signals comprise images of light sources, mechanical toggle switches, and mechanical rotary switches.

10. Method according to claim 7, wherein the electronic circuits take the form of cards, and the group comprises cards within a rack.

11. Method according to claim 10, wherein the controller means enables display apparatus at the remote location to accurately display views of all cards within the group both
    i) before replacement of a card within the rack by a card of a different type, and
    ii) after the replacement.

12. Method according to claim 7, wherein each electronic circuit contains the image-data indicating its appearance.

13. Method according to claim 7, wherein the request of paragraph (d) for image data is sent to the site.

14. Method according to claim 7, wherein the request of paragraph (d) for image data is sent to an INTERNET address.

15. Method according to claim 7, wherein the request of paragraph (d) for image data is sent to a manufacturer of the electronic circuit.

* * * * *